United States Patent
Johnson

(10) Patent No.: US 7,886,023 B1
(45) Date of Patent: Feb. 8, 2011

(54) METHOD AND APPARATUS FOR A MINIMALIST APPROACH TO IMPLEMENTING SERVER SELECTION

(75) Inventor: Kirk Johnson, Boulder, CO (US)

(73) Assignee: Cisco Technology, Inc., San Jose, CA (US)

( * ) Notice: Subject to any disclaimer, the term of this patent is extended or adjusted under 35 U.S.C. 154(b) by 880 days.

(21) Appl. No.: 09/824,527

(22) Filed: Apr. 2, 2001

Related U.S. Application Data

(63) Continuation of application No. 09/766,877, filed on Jan. 19, 2001, now abandoned.

(60) Provisional application No. 60/177,415, filed on Jan. 21, 2000.

(51) Int. Cl.
*G06F 15/16* (2006.01)

(52) U.S. Cl. ............................................... 709/219

(58) Field of Classification Search ......... 709/217–219, 709/223–226, 203, 227–229
See application file for complete search history.

(56) References Cited

U.S. PATENT DOCUMENTS

| | | | | |
|---|---|---|---|---|
| 5,603,029 | A | * | 2/1997 | Aman et al. ............... 718/105 |
| 5,848,234 | A | * | 12/1998 | Chernick et al. ........... 709/203 |
| 5,870,562 | A | | 2/1999 | Butman et al. |
| 5,881,238 | A | * | 3/1999 | Aman et al. ............... 709/226 |
| 6,006,218 | A | * | 12/1999 | Breese et al. ................ 707/3 |
| 6,035,055 | A | | 3/2000 | Wang et al. |
| 6,041,041 | A | | 3/2000 | Ramanathan et al. |
| 6,052,718 | A | | 4/2000 | Gifford ...................... 709/219 |
| 6,078,943 | A | | 6/2000 | Yu |
| 6,078,960 | A | * | 6/2000 | Ballard ...................... 709/229 |
| 6,081,840 | A | | 6/2000 | Zhao |
| 6,092,178 | A | * | 7/2000 | Jindal et al. ................ 712/27 |
| 6,108,703 | A | | 8/2000 | Leighton et al. |
| 6,134,588 | A | * | 10/2000 | Guenthner et al. ......... 709/226 |
| 6,173,322 | B1 | * | 1/2001 | Hu ............................ 709/224 |
| 6,185,598 | B1 | | 2/2001 | Farber et al. |

(Continued)

FOREIGN PATENT DOCUMENTS

WO     WO 99/40514     12/1999

OTHER PUBLICATIONS

Overview of the Cisco Distributed Director 4700-M, http://www.cisco.com/univerced/cc/td/doc/product/iaabu/distdir/dd4700m/overview.htm, accessed Sep. 14, 2005.

(Continued)

*Primary Examiner*—Benjamin R Bruckart
(74) *Attorney, Agent, or Firm*—Hamilton, Brook, Smith & Reynolds, P.C.

(57) ABSTRACT

Server selection is optimized using randomness, feedback, and fanout. A central server maintains a vector of server selection probabilities and provides a subset of candidate servers from the vector for the client in response to receiving from a client a request for a server address to provide substantive service. An interrogating node (i.e., the client or DNS proxy) probes the candidate servers and selects a best server based on at least one criterion. The client accesses the selected server for the substantive data, and the selected server updates a counter used to keep track of the number of times the server is selected. The servers feedback the number of times selected to the central server, which, in turn, updates weightings in the vector of server selection probabilities.

71 Claims, 13 Drawing Sheets

U.S. PATENT DOCUMENTS

| | | | |
|---|---|---|---|
| 6,185,619 B1* | 2/2001 | Joffe et al. | 709/229 |
| 6,249,800 B1* | 6/2001 | Aman et al. | 718/105 |
| 6,249,801 B1* | 6/2001 | Zisapel et al. | 718/105 |
| 6,256,675 B1 | 7/2001 | Rabinovich | |
| 6,298,451 B1* | 10/2001 | Lin | 714/4 |
| 6,304,913 B1 | 10/2001 | Rune | |
| 6,324,580 B1 | 11/2001 | Jindal et al. | |
| 6,338,092 B1 | 1/2002 | Chao et al. | |
| 6,345,294 B1 | 2/2002 | O'Toole et al. | 709/222 |
| 6,389,448 B1* | 5/2002 | Primak et al. | 709/225 |
| 6,421,716 B1* | 7/2002 | Eldridge et al. | 709/219 |
| 6,430,618 B1 | 8/2002 | Karger et al. | |
| 6,449,647 B1* | 9/2002 | Colby et al. | 709/226 |
| 6,502,125 B1 | 12/2002 | Kenner et al. | |
| 6,505,254 B1 | 1/2003 | Johnson et al. | |
| 6,539,426 B1* | 3/2003 | Meek et al. | 709/223 |
| 6,553,413 B1* | 4/2003 | Leighton et al. | 709/219 |
| 6,553,420 B1 | 4/2003 | Karger et al. | |
| 6,571,288 B1* | 5/2003 | Sarukkai | 709/226 |
| 6,578,066 B1* | 6/2003 | Logan et al. | 718/105 |
| 6,581,065 B1 | 6/2003 | Rodkin et al. | |
| 6,795,434 B1* | 9/2004 | Kumar et al. | 370/392 |
| 6,795,858 B1* | 9/2004 | Jain et al. | 709/226 |
| 6,871,210 B1* | 3/2005 | Subramanian | 709/203 |
| 6,928,481 B1* | 8/2005 | Harris et al. | 709/228 |
| 6,950,849 B1* | 9/2005 | Brandstatter | 709/203 |
| 6,959,333 B2 | 10/2005 | Beaumont et al. | |
| 6,963,914 B1* | 11/2005 | Breitbart et al. | 709/226 |
| 6,970,932 B1* | 11/2005 | Juster | 709/229 |
| 6,981,029 B1* | 12/2005 | Menditto et al. | 709/217 |
| 7,003,581 B1* | 2/2006 | Lamberton et al. | 709/238 |
| 7,020,698 B2 | 3/2006 | Andrews et al. | |
| 7,027,773 B1* | 4/2006 | McMillin | 455/41.2 |
| 7,032,010 B1* | 4/2006 | Swildens et al. | 709/219 |
| 7,058,706 B1 | 6/2006 | Iyer et al. | |
| 7,086,061 B1* | 8/2006 | Joshi et al. | 718/105 |
| 7,111,061 B2 | 9/2006 | Leighton et al. | |
| 2001/0039585 A1* | 11/2001 | Primak et al. | 709/228 |
| 2001/0049741 A1* | 12/2001 | Skene et al. | 709/232 |
| 2002/0038360 A1* | 3/2002 | Andrews et al. | 709/223 |
| 2002/0065938 A1 | 5/2002 | Jungck et al. | |
| 2002/0116525 A1* | 8/2002 | Peters et al. | 709/242 |
| 2002/0186694 A1 | 12/2002 | Mahajan et al. | |
| 2003/0041094 A1 | 2/2003 | Lara et al. | |
| 2003/0177162 A1* | 9/2003 | Staiger et al. | 709/102 |

OTHER PUBLICATIONS

Rabinovich, "Issues in Web Content Replication," pp. 21-29, 1998, IEEE.

Cardellini, et al., "Dynamic Load Balancing on Web-Server Systems," IEEE Internet Computing, May-Jun. 1999, pp. 28-39.

U.S. Appl. No. 09/294,837, filed Apr. 19, 1999, entitled "Dynamic Server Organization" (Copy not available).

U.S. Appl. No. 09/535,279, by Gang Lu et al., filed Mar. 24, 2000, entitled "Method and Apparatus for Automatic Network Address Assignment".

U.S. Appl. No. 09/824,553, by Kirk Johnson et al., filed Apr. 2, 2001, entitled "Method and Apparatus for Determining a Network Topology in the Presence of Network Address Translation".

U.S. Appl. No. 09/642,165, by Liskov et al., filed Aug. 18, 2000, entitled "Content Server Selection for Accessing Content in a Distribution Network".

U.S. Appl. No. 09/642,143, by Day et al., filed Aug. 18, 2000, entitled "Remote Identification of Client and DNS Proxy IP Address".

Amir, Yair et al., "Seamlessly selecting the best copy from Internet-wide replicated web servers" *The 12$^{th}$ International Symposium on Distributed Computing*, (DISC'98), Sep. 22-23, 1998.

Amir and Shaw, "WALRUS- a Low Latency, High Throughput Web Service Using Internet-wide Replication," In Proceedings of the 19$^{th}$ IEEE Workshop on Electronic Commerce and Web-Based Applications, pp. 31-40, Austin, May 1999, http://www.cnds.jhu.edu/publications/ May 16, 2002.

Bakker, A., et al. "The Globe Distribution Network," *Proc. 2000 USENIX Annual Conf. (FREENIX Track)*, San Diego, pp. 141-152, Jun. 18-23, 2000, http://www.cs.vu.nl/globe/publications.html May 16, 2002.

Carter, R.L. and Crovella, M.E., "Dynamic Server Selection using Bandwidth Probing in Wide-Area Networks," BU-CS-96-007, Mar. 18, 1996, http://citeseer.nj.nec.com/carter96dynamic.html May 16, 2002.

Francis, Paul. "VOID: Extending the Internet Multicast Architecture," [online] http://www.icir.org/yoid/docs/ycHtmlL/htmlRoot.html May 21, 2002.

Guyton,James D.and Schwartz, Michael F.,"Locating Nearby Copies of Replicated Internet Servers" *Computer Communications Review* 25(4): 288-98 (1995).

Karger, D.R. et al.,"Consistent hashing and random trees: Distributed caching protocols for relieving hot spots on the world wide web" *Proc. 29$^{th}$ ACM Symposium on Theory of Computing*, 654-662, May 1997.

Leach, Paul J., "Selecting a server from among many replicas," Internet Draft, [online] ASID working group, Feb. 23, 1997, http://www.watersprings.org/pub/id/draft-ietf-asid-replica-selection-00.txt May 21, 2002.

Sayal, M., et al. Selection Algorithms for Replicated Web Servers, [online] www.cs.wisc.edu/~cao/WISP98/html-versions/mehmet/SelectWeb1.html May 16, 2002.

\* cited by examiner

MINIMALIST ROUTING PERFORMANCE ON 1,000 SERVERS, ROUND 1
(PACKET LOSS RATES BETWEEN 0.00 AND 0.40)

MINIMALIST ROUTING PERFORMANCE ON 1,000 SERVERS,
AVERAGE SERVER RANK AS A FUNCTION OF PACKET LOSS RATE

METHOD AND APPARATUS FOR A MINIMALIST APPROACH TO IMPLEMENTING SERVER SELECTION

RELATED APPLICATION(S)

This application is a continuation of application Ser. No. 09/766,877, filed Jan. 19, 2001, now abandoned which claims the benefit of provisional application No. 60/177,415 entitled "Method and Apparatus for Minimalist Approach to Implementing Server Selection" filed Jan. 21, 2000, the entire teachings of which is incorporated herein by reference in its entirety.

BACKGROUND OF THE INVENTION

In a network as vast as the Internet, server selection is important for client-server communication speed and network load balancing. One approach to server selection is through manual entry. Addresses of servers designated to service zones of clients are entered into a client-server database located in a network node used to provide server selection, such as a DNS (Domain Name System) proxy. The database essentially partitions the network clients. Thereafter, the address of a server designated to service a client request is returned from the database.

Theoretically, the manual entry method just described may be automated by automatic partitioning of the Internet, or other wide area network, into zones in a partitioning database. Clients access the partitioning database for addresses of servers within their respective zones. In practice, however, automatic partitioning is complicated in the case of the Internet, other wide area network, or large-scale inter-networks due to the size, complexity, and dynamic nature of the networks in question. Therefore, partitioning approaches fall short of being an optimum technique for providing server selection in an automated manner.

Server selection is provided through the use of a DNS protocol. Server selection could also be implemented through other protocols; DNS is, however, a common protocol today and is therefore being used here as an exemplary protocol. Typically, clients on the Internet are so-called "dumb" browsers that have little inherent intelligence. For example, a user enters a website name into the browser, and the browser must access a DNS proxy, or other network node capable of converting the "host" components of URLs (Uniform Resource Locators) to IP (Internet Protocol) addresses, i.e., in order to convert the website name into a corresponding IP address. The DNS proxy has in a database a list of one or more addresses of servers that are capable of providing the service requested by the client. From that list, the DNS proxy returns an address of a server to the client. However, there may be instances where the DNS proxy is unable to resolve a fully-qualified domain name (FQDN)—sometimes referred to as simply a domain name—to an IP address, so the DNS proxy accesses an authoritative network node that is able to provide a list of possible servers.

The server selection mechanism is implemented using DSN proxies generally as follows. Upon receiving a request from a client, the DNS proxy probes at least one candidate server in the list. The probed candidate server(s) responds to respective probes from the DNS proxy. The DNS proxy reports to the client the address(es) of a candidate server(s) that can provide reasonable service to the client, as determined by round trip probe time. The client uses the server address to access the corresponding server for substantive service.

SUMMARY OF THE INVENTION

The behavior of large-scale inter-networks, such as the Internet, is often quite dynamic, making manual partitioning of the network address space into service zones for the available servers both difficult and frequently inferior to an automated technique for determining optimum server selection. Automatic network partitioning techniques do not scale well, therefore limiting their effectiveness for a network as large, dynamic, and complex as the Internet. Furthermore, even though the DNS protocol provides server selection in a simple sense (e.g., round-trip probe time), that criterion may not always be the optimum server selection criterion for selection of a server.

An automated, optimum, server selection solution is provided without requiring manual entry and/or network partitioning. In a DNS protocol context, the present invention leverages the DNS protocol to aid in the server selection process. In both non-DNS and DNS protocol embodiments, randomness, feedback, and fanout are employed to locate an optimum server for a client, based on at least one criterion (e.g., best network connectivity, least loaded, etc.).

More specifically, the present invention optimizes server selection for a client among a plurality of servers in a packet communication network. A plurality of servers capable of providing service to a client are coupled to the network. Each server keeps a count of the number of times it is selected to provide service to the clients. The counts are fed back periodically to a central server also coupled to the network. The central server stores a vector of server selection probabilities, where each server is represented by a respective probability related to its count. The central server receives a request from the client for a server address and responsively provides for the client a candidate server selection list including addresses of randomly selected servers from among the servers represented in the vector; servers are selected according to the probabilities in the vector. The requesting client probes candidate servers represented in the list of candidate server addresses and selects a candidate server to provide substantive service.

In a DNS protocol environment, a DNS server or proxy receives the client request from the client and forwards the client request to the central server. In this embodiment, rather than the probing of each candidate server being executed by the client, the DNS proxy probes each of the candidate servers in the list of candidate server addresses. The DNS proxy further selects the server as being a best-fit server as determined by the results of probing each candidate server. In this DNS case, the first candidate server to respond to the probe is selected by the DNS server as the best-fit server and that candidate server's address is returned to the client. The DNS server may also indicate to the selected candidate server that it has been selected to provide service to the requested client. The candidate server, which may now be referred to as the selected server, updates its count to reflect having been selected. In an alternate embodiment in the DNS protocol scenario, since the client is passive, the DNS server transmits to the client a redirection packet to cause the client to issue a packet intended to cause the selected server to increment its count.

In either embodiment, the candidate server selection list returned to the client may include extra, randomly selected, server addresses, selected from among the servers represented in the vector of server selection probabilities according to some a priori probability distribution. By including, in the candidate server selection list, servers that might otherwise not be returned to the client allows the system to occasionally direct probes to candidates that have previously been deemed to be suboptimal and, thus, allows the system to adapt to dynamic, time-varying network conditions. For example, a server that had previously been deemed suboptimal—and thus had the corresponding entry in the vector of selection probabilities reduced to near zero—may become desirable again due to a change in network conditions (e.g., decreased congestion, additional network resources brought on-line, etc.). By occasionally directing client probes to that server, the system can notice (via the feedback of server selection counts into the vector of selection probabilities) the improved ability of the server in question to provide service to the client. In the simplest case, a uniform distribution (in which all elements are equally likely) could be used for the a priori probability distribution used to select these extra server addresses. In general, however, this a priori probability distribution could be used to encode externally-derived knowledge or biases about server selection by increasing probabilities for servers that should be included more frequently or decreasing probabilities for those that should be included less frequently.

The number of extra, randomly selected server addresses may be a fixed percentage of the total number of candidate servers to be returned to the client or a fixed number independent of the number of candidate servers to be returned to the client. Alternatively, individual entries in the candidate server list can be (i) chosen according to the vector of selection probabilities with some fixed probability and (ii) selected according to the a priori probability distribution otherwise. Optionally, each server address in the candidate server selection list is unique from each other server address in the list, which increases the fanout of probes by the interrogating node (i.e., the client or DNS server) probing the candidate servers whose addresses are returned in the candidate server selection list.

The feedback of counts from candidate servers to central server(s) occurs according to at least one of the following criteria: number of times the server is selected, duration from the last feedback, time of day, or requested event. The probabilities in the vector of server selection probabilities are optionally based on bias factors to reduce convergence time, including one of: number of times selected, moving average based on length of recording time, historical count information (e.g., counts that were observed at the same time(s) on previous days, time of day, time of year, calendar event, or geographical location. The values in the vector of server selection probabilities are calculated to sum to one.

The central server may include multiple vectors of server selection probabilities, where unique vectors of server selection probabilities are provided and maintained for subsets of clients. The central server may include multiple central servers organized as a distributed system. The probes issued by the interrogating node measure at least one of the following: network performance (e.g., round trip time of the probes, packet loss rates for the probes, or other suitable metric) between client and server, server congestion, or server load.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows. The core of the server selection problem may be expressed as follows: given a request or sequence of requests from a single client or clustered group of clients, attempt to map those requests to servers that optimize at least one criterion, such as best network connectivity or least loaded. For the purposes of this discussion, it is assumed that something approximating best network connectivity (including congestion effects) is a criterion being optimized. Another portion of the problem is to employ the present invention within the framework of existing packet communication networks, such as large-scale inter-networks, of which the Internet 110 is an example. It is desirable to not require manual entries or portioning of the network for installation or operation because of the dynamic nature of networks. Thus, without requiring manual entry or partitioning of the network, client requests are mapped to servers while optimizing the criteria discussed above.

Figure 1:
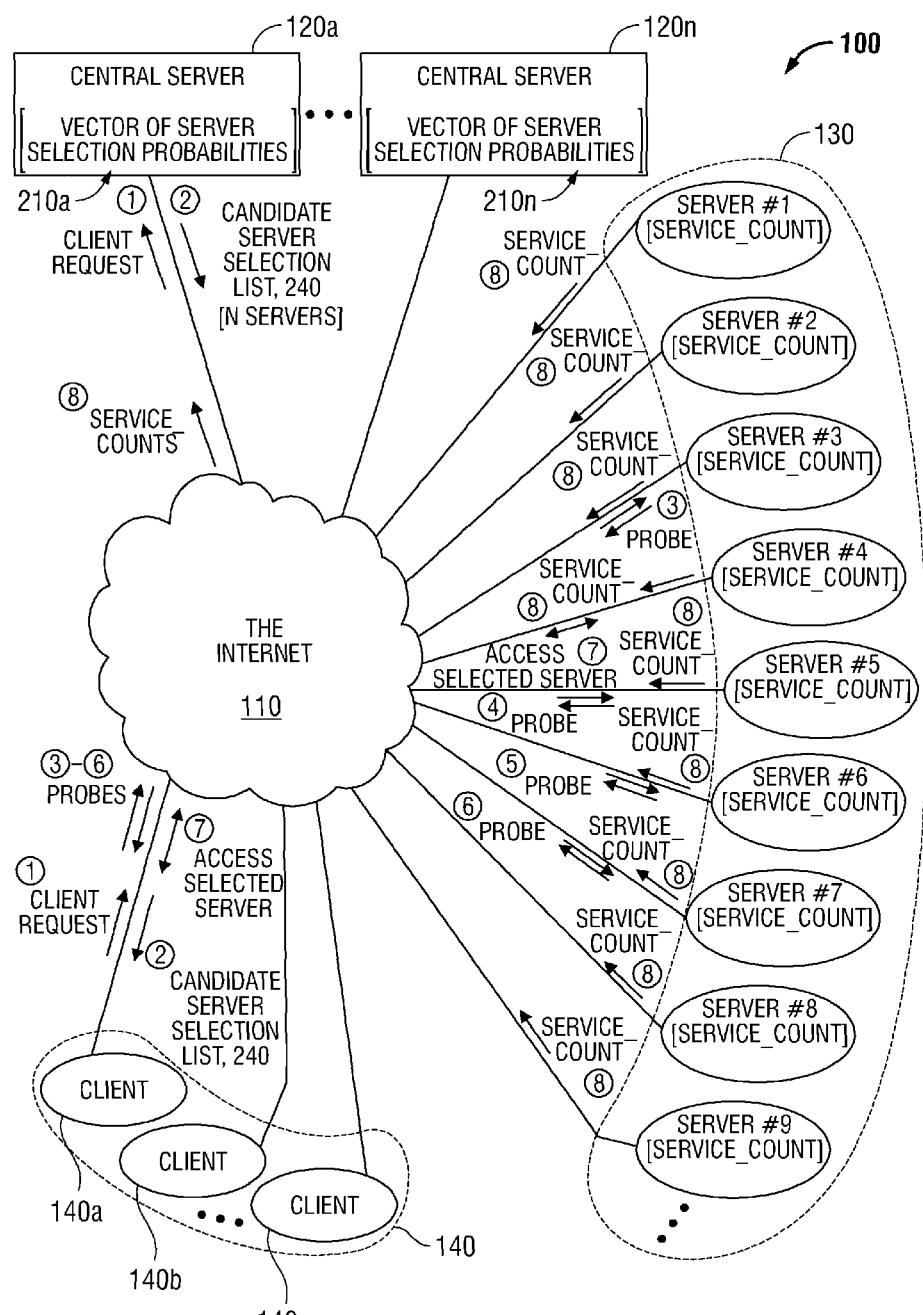
FIG. 1 is a block diagram of a network having central servers, servers, and clients, in which the present invention is deployed.

FIG. 1 is a block diagram of a network 100 in which the present invention is deployed. In the example network, network packets having information relating to the present invention are transmitted across the Internet 110 when being transmitted to or from nodes transferring or receiving the network packets. These nodes include central servers 120, candidate servers 130, and clients 140. These nodes 120, 130, 140 on the network 100 are shown external from the Internet 110, but, in practice, may be located anywhere in the Internet 110 and use standard or non-standard links to the Internet 110.

The central servers 120a, 120b, . . . , 120n, (collectively 120) provide (i) a central or starting point for clients 140a, 140b, . . . , 140n (collectively 140) to contact; and (ii) a database and processing to provide clients 140 with a list of candidate servers 130 corresponding to a service request from one of the clients 140.

The clients 140 may be either active or passive. Active clients take an active role in one embodiment of the present invention; passive clients are directed to perform limited actions by active components, such as the central servers 120. Some forms of active clients include network appliances, intelligent nodes, computer applications, or servers. Some forms of passive clients include web browsers or applications that request service but in which there is no intelligence with respect to the present invention. In the case of passive clients, extra parameters and/or redirection packets are issued to the passive clients from another node (e.g., the central server 140a) to aid in the process of mapping a client request to an optimum server. In one embodiment, passive clients talk to another agent (e.g., DNS proxy) that has enough "active" nature to support the use of the passive client.

The candidate servers 130 provide substantive service for client requests. The candidate servers 130 comprise a service_ counter that records the number of times (i.e., service_ counts) the respective candidate servers have been selected by the clients to provide substantive service. Service_counts represent a service metric indicating service provided by the server. At periodic or non-periodic intervals, the candidate servers 130 report their respective service_counts to the central server 120.

Coordination among the components is shown as enumerated packets along links among the nodes 120, 130, 140. Step 1 of the process is the client request, which is issued by a client 140a to one of the central servers 120, here, central server 120a. Responsively, the central server 120a accesses the vector of server selection probabilities 210a for providing to the requesting client a randomly or pseudo-randomly selected list of addresses, also referred to as a candidate server selection list, corresponding to several of the candidate servers 130. In Step 2, the central server 120a returns N servers to the client 140a in at least one communication packet comprising a subset or the entire candidate server selection list 240.

After receiving the candidate server selection list in Step 2, the client 140a parses the candidate server selection list 240 to access the addresses corresponding to the candidate servers 130. In Steps 3 through 6, the client interrogates a subset of the candidate servers in the candidate server selection list 240 by issuing probes to the candidate servers. In the example shown, the probes are issued to server_3, server_5, server_6, and server_7. For simplicity, the probes simply indicate round-trip time from the client 140a to the servers 130 and back to the client 140a. A probe may be in the foini of a "ping" or a "traceroute" when measuring round-trip time. Other forms of probes may access the servers for congestion or load metrics, or have the servers perform some processing in order to determine the load, processing delay, or other forms of information that may be used to determine best network connectivity, least loading, or other congestion effects.

It should be understood that the process of Steps 3-6 that are issued to multiple candidate servers acts as a fanout mechanism. The fanout mechanism (i.e., multiple probes) is designed to add robustness to the server selection process operating in the dynamically changing network. For example, if a certain route is down due to power failure, congestion or otherwise, then one (or several) probes may not reach their intended candidate servers 130. Therefore, the more probes that are used, the higher the likelihood that at least one of the probes will reach a candidate server capable of supporting the client, and, hence robustness. In the event that the client receives no probe responses, robustness can also be accomplished by retrying probes to some number of candidate servers. Clients may also maintain some historical information about which candidate servers have tended to provide the best service in order to bias the selection of candidate servers to be probed. After receiving the probes back from each of the candidate servers 130, the client 140a makes a determination according to one or several criteria as to which candidate server 130 optimizes at least one service criterion.

The client 140a accesses the selected server in Step 7. In this example, the client selects server_5. Communication between the client 140a and the server_5 continues until the requested service is complete. The requested service is transacted via communication packets between the client 140a and server_5 across the Internet 110. Because the client has selected server_5, the service_count in server_5 is incremented by server_5.

At periodic or non-periodic intervals, each server 130 reports its service_count to the respective central server that tracks the number of times the respective server has been selected by the above-described process. For example, the feedback may occur after a certain number of times the server is selected, such as one hundred selections. Alternatively, the feedback may occur according to a time interval, such as duration from the last feedback, time of day, or upon a request from the central server or other node.

The feedback mechanism provides the central server with information for updating a vector of server selection probabilities 210a. The probabilities are a specific form of weight, or weighting factors used to bias or influence the random selection of candidate server addresses to be returned to the requesting client in the candidate server selection list of Step 2. Details of the vector of server selection probabilities 210a are shown in FIG. 2.

Figure 2:
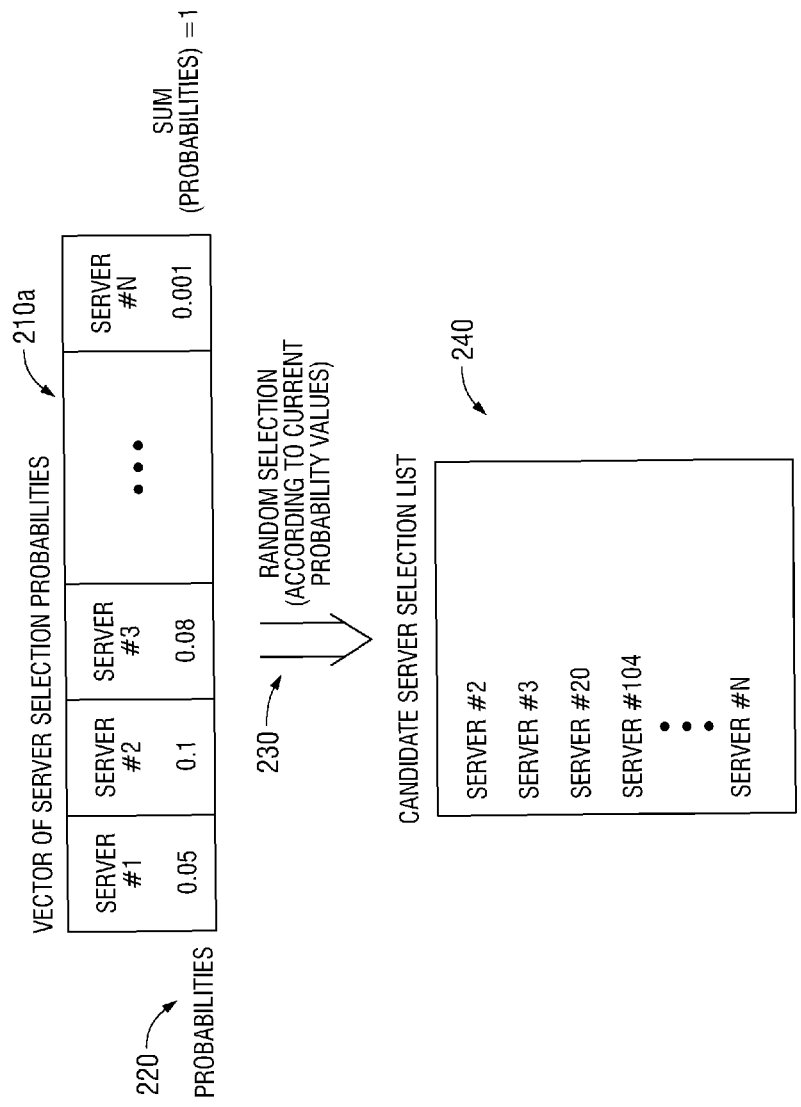
FIG. 2 is a block diagram of information stored in and returned from the central servers for the clients to assist in selecting a server in the network of FIG. 1.

FIG. 2 is a block diagram of a portion of the process occurring in the central server 120a with relation to the vector of server selection probabilities 210a. The central server 120 (i) maintains the vector of server selection probabilities 210a, (ii) randomly or pseudo-randomly selects several addresses corresponding to respective servers represented in the vector of server selection probabilities 210a, and (iii) provides a candidate server selection list 240, which includes the several selected addresses, for a requesting client.

The vector of server selection probabilities 210a includes probabilities 220, typically one for each respective candidate server represented. The probabilities 220 are one form of weights that may be maintained in the vector(s). In the simplest case, the vector of server selection probabilities is initialized such that all servers are equally likely to be chosen as server candidates; more sophisticated approaches involve "seeding" the server selection probabilities based on a priori information. This a priori information may include: number of times selected, moving average based on length of recording time, historical count information (e.g., counts that were observed at the same time on previous days), time of day, time of year, calendar event, or geographical location.

As indicated, the sum of the probabilities 220 equals 1.0, (i.e., exhaustive). Over time, the probabilities tend to diverge from their initialization settings, but the sum continues to equal 1.0. Divergence results from the counts being fed back to the central server 120 from a candidate server 130, as discussed in FIG. 1, Step 8. The higher the count returned from the candidate servers, the higher the probability corresponding to the respective candidate server. This is so because a candidate server is being chosen for a reason; said in another way, other servers are not being selected by the clients for a reason. Thus, a candidate server represented in the vector by a high probability (i.e., having a heavy weighting) has a high probability because it has been selected by client(s) in favor of other servers and is thus also more likely in the future to be chosen than other servers during the candidate server selection process.

The candidate server selection list 240 includes a plurality of addresses corresponding to respective servers. To assist a new candidate servers in becoming integrated into the server selection process—or more broadly, to adapt to a changing network—the server selection process optionally employs a related randomness factor. This factor adds extra, randomly or pseudorandomly chosen, candidate server addresses to the candidate server selection list 240. These extra, randomly-selected servers are not chosen according to the values in the selection probability vector, but instead according to some fixed method (e.g., uniformly). Thus, over time, candidate servers newly added to the network 100 are phased into the client request-to-candidate server mapping process.

The number of extra, randomly selected server addresses included in the candidate server selection list 240 may be specified in various ways, including: (i) as a fixed percentage of the total number of candidate servers to be returned to the client, (ii) a fixed number independent of the number of candidate servers to be returned to the client, or (iii) individual entries in the candidate server list to be (a) chosen according to the vector of selection probabilities with some fixed probability and (b) selected according to the a priori probability distribution otherwise. Optionally, each server address in the candidate server selection list is unique from each other server address in the list, which increases the fanout of probes by the interrogating node (i.e., the client or DNS server) probing the candidate servers whose addresses are returned in the candidate server selection list.

The robustness of the present invention is improved by several factors. First, the selection process of servers from among the servers represented in the vector of selection probabilities 210a is random or pseudo-random. Second, the selection process includes a random, or optionally pseudo-random, selection of extra servers, which enables the present invention to adapt in the presence of dynamic, time-varying network conditions. Third, the selection process optionally restricts listing candidate servers more than once in the candidate server selection list, which, by improving fanout, improves the rate of convergence for the vector of selection probabilities.

An example of a possible technique for updating the probabilities 220 may be useful. Assume the total number of counts returned from all of the servers sum to one hundred. If, for instance, server_7 returns a service_count of fifty, then the probability corresponding to server_7 in the vector of server selection probabilities 210 is equal to 50/100, or fifty percent. As briefly discussed earlier, seeding the vector of server selection probabilities may improve (i.e., reduce) the convergence time of the server selection process. For instance, a network operator may have information about the servers 130 or network 100 that influences how well a server or group of servers is servicing or will service one or more clients 140.

The operator may add a small percentage, or large percentage, to one or more server probabilities (while taking away from others to maintain a sum of one) to increase the likelihood that the respective server(s) are selected by the random selection process. For example, if a client is in California, then an operator may increase the probability that a server located in California is selected over servers located in New York. Of course, other factors may be included to reduce the server selection process convergence time. The present invention provides for any number of "seeding" factors that may be programmed into the server selection process to reduce convergence time. A non-exhaustive list of seeding factors include: the number of times the servers have been selected (either a present-time count or a moving average count), time of day, time of year (e.g., holidays, end-of-quarter), or part of country. Seeding factors may be entered via automatic or human means.

It should be noted that each central server 120 may include more than one vector of server selection probabilities 210. Each vector of selection probabilities corresponds to a different subset of clients (e.g., as determined by grouping of IP addresses, reverse-resolution of IP addresses and grouping by domain name, or manual configuration). The contents of the vectors may be randomly shuffled or periodically cleared and refilled to account for the dynamic nature of the network 100.

Figure 3:
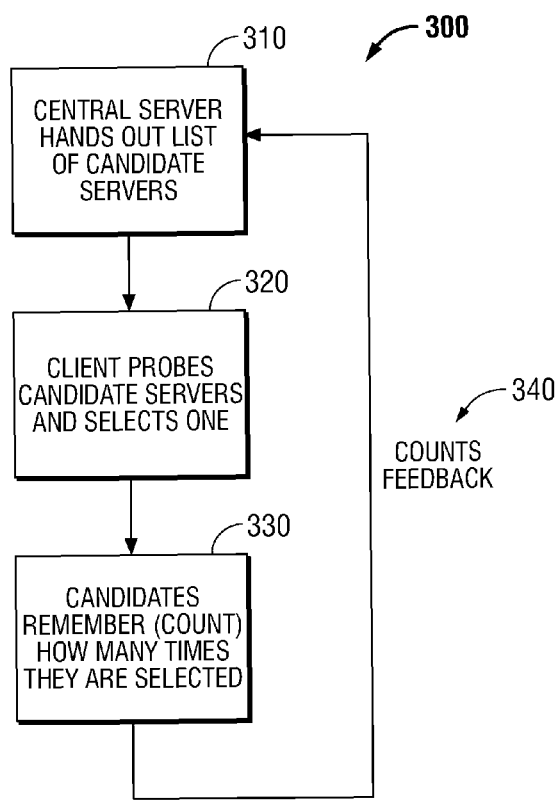
FIG. 3 is a generalized flow diagram of an embodiment of the process operating in the network of FIG. 1.

The processes described in reference to the enumerated steps in FIGS. 1 and 2 are further illustrated and described in FIGS. 3 and 4. FIG. 3 is a generalized flow diagram of an embodiment of a process 300 operating in the network nodes 120, 130, 140 system depicted in FIG. 1. In the process 300, step 310 is executed by the central server 120, step 320 is executed by the clients 140, and steps 330 and 340 are executed by the candidate servers 130. Each of the links between steps 310, 320, 330 employs packetized communications across the Internet 110.

In general, the process 300 is a feedback loop that causes the process of mapping client requests to servers to converge in such a way that client requests will be mapped to near-optimal or optimal servers. In the flow diagram, each step indicates a different process performed in the various nodes of the system, namely the central servers 120, candidate servers 130, and clients 140. It should be understood that, in each case, at least one processor executes a set of machine instructions that are stored in a non-transitory computer readable medium, such as RAM, ROM, CD-ROM, magnetic disk drive, or a remote storage medium accessible over the packet communication network 100. Alternatively, an ASIC (application specific integrated circuit) or embedded processor may be employed to accomplish various aspects of the process 300.

The process 300 begins in step 310 with a central server issuing a list of candidate server addresses to a client in response to receiving a client request. In this embodiment, in step 320, the client probes the candidate servers and selects one according to criteria, as described in reference to FIG. 1. In step 330, the candidate servers remember, or count, how many times they are selected. In step 340, the service_counts are fed back from the clients to the central server. The central server updates the vector of server selection probabilities 210 from which the candidate servers are selected.

FIGS. 4A-4D are detailed flow diagrams corresponding to the generalized flow diagram of FIG. 3. The diagrams are separated into client 140a, central server 120a, and candidate server 130a sections, where the flow diagrams in each section are executed by the respective nodes. Linkages between the flow diagrams operating in the three separate nodes indicate data flow. It should be understood that the processes within the respective nodes may be employed by multiple nodes of each respective type. For example, the central server process_310 may be employed by all central servers 120 selecting optimum servers.

Figure 4A:
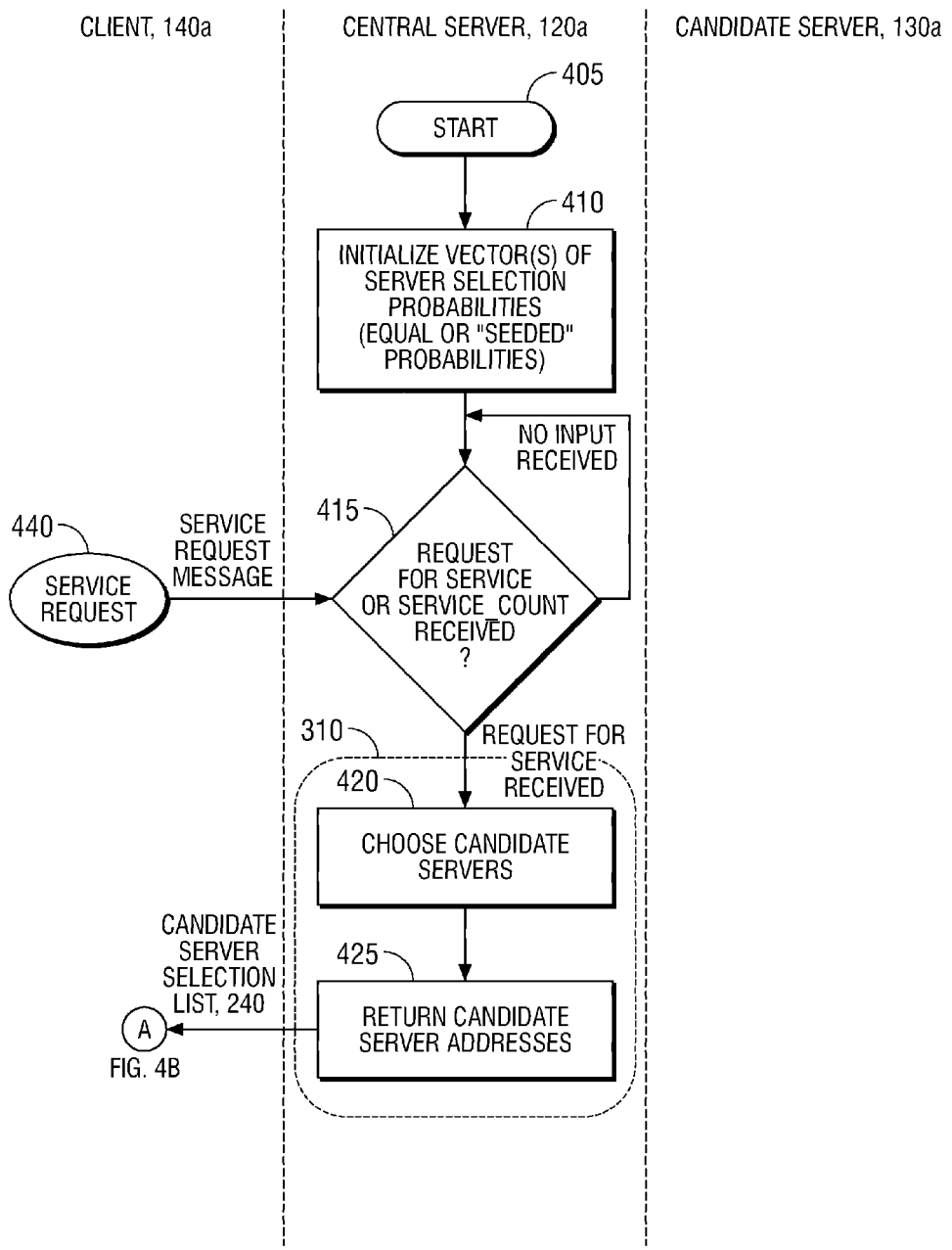
FIG. 4A is a detailed flow diagram of a first portion of the process of FIG. 3.

Referring to FIG. 4A, beginning in step 405, the process in the central server 120a begins execution. In step 410, at least one vector of server selection probabilities 220 is initialized. As previously described, the vector may be initialized with equal probabilities or "seeded" with non-equal probabilities. After initialization, the central server 120a begins servicing service requests from the client 140a, issued by a service request routine 440, and accepting feedback from the candidate server 130a, discussed later in reference to FIG. 4D.

Continuing to refer to FIG. 4A, in step 415, the central server 120a determines whether it has received a request for service from the client 140a or has received a service_count fed back from a candidate server 120a. If neither a request for service from a client nor a service_count from a candidate server has been received, then step 415 loops back upon itself. In an alternative embodiment, either input causes a service interrupt rather than the looping just described. If a request for service has been received, then step 415 proceeds to step 420.

In step 420, the process 310 selects candidate servers from the vector of server selection probabilities 220 (FIG. 2) for the client 140a. As described previously, the chosen candidate server selection list 240 (FIG. 2) may include extra candidate server addresses to assist in adapting to dynamic changes among the candidate servers 130 on the network 100. After choosing the candidate servers in step 420, the process 310 returns the addresses or other identifying information of the selected candidate servers to the client in step 425. The process continues at point A in FIG. 4B.

Figure 4B:
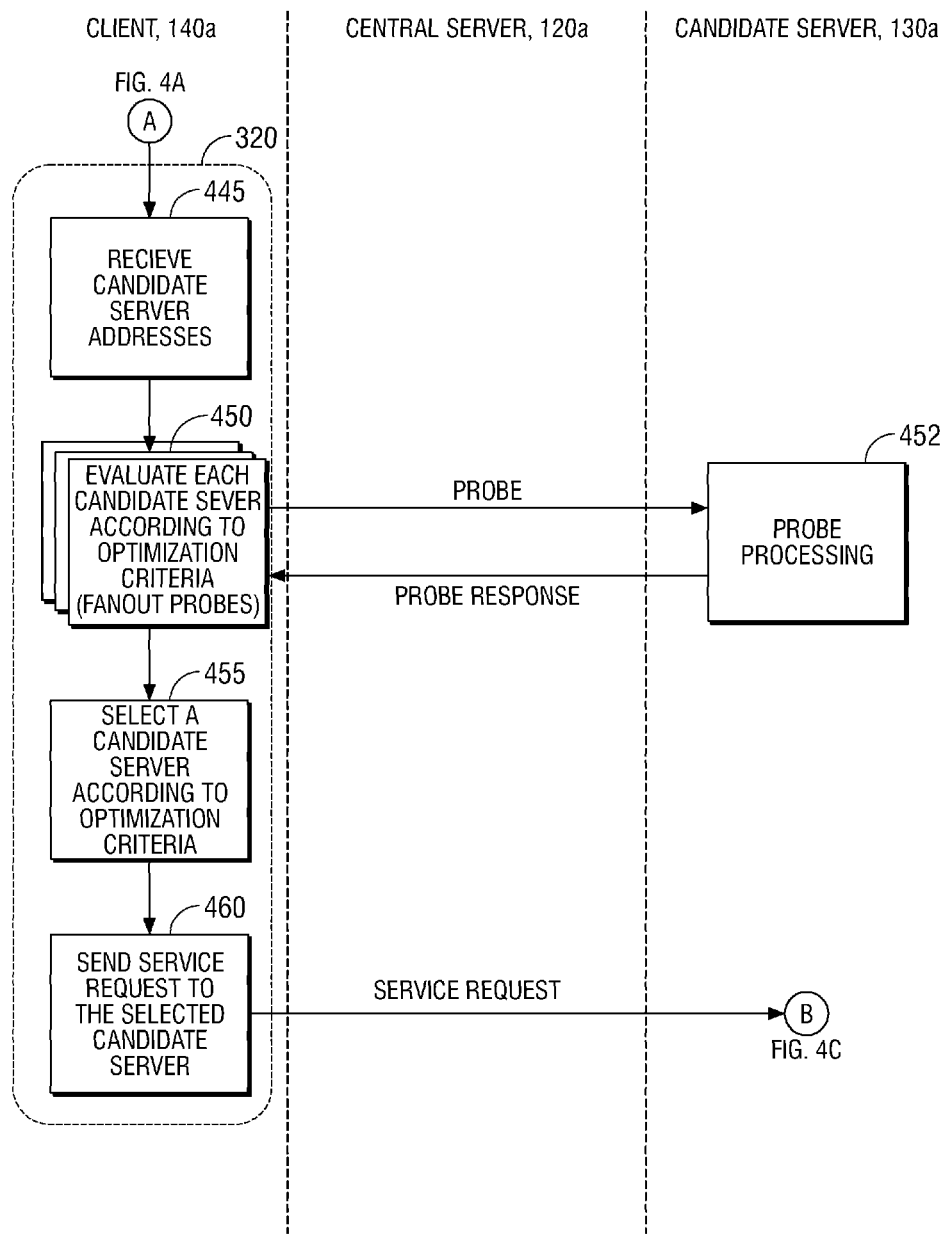
FIG. 4B is a detailed flow diagram of a second portion of the process of FIG. 3.

Referring to FIG. 4B, detail of the process 320 operating in the client 140a is outlined in steps 445-460. In step 445, the client receives a candidate server selection list 240 from the central server 120a. In step 450, each candidate server represented in the list 240 is evaluated according to optimization criteria. The evaluation by step 450 includes probing the candidate servers. The candidate servers 130 may comprise a dedicated probe processing routine 452 designed to support the evaluation process of step 450.

In step 455, the client selects a candidate server according to optimization criteria from among the candidate servers that were probed. The criteria may include round-trip time of the probes, packet loss rates for the probes, server congestion, or server load.

Figure 5:
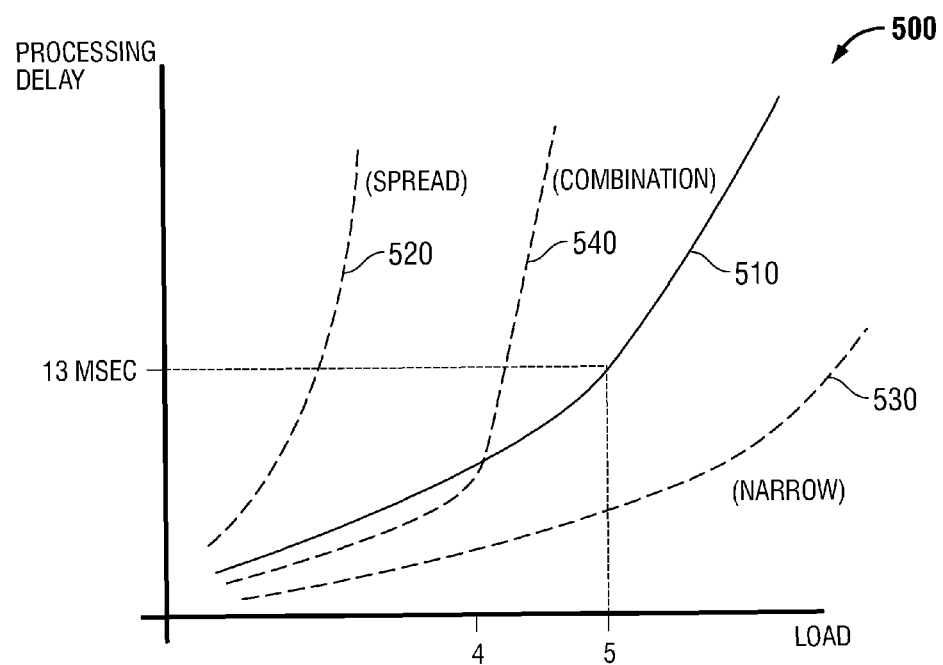
FIG. 5 is a plot relating load to delay whose characteristics may be employed by the servers of FIG. 1.

FIG. 5 is a chart that indicates how a candidate server may actively take part in the process of selecting a good server. Referring to FIG. 5, the chart 500 has a "load" axis and a "processing delay" axis. The load axis provides a metric that corresponds to the load the candidate server is experiencing. The load axis may be in units of either instantaneous or average load. The processing delay axis provides a time measure for servicing client requests through the candidate server.

In the chart 500, a solid line 510 indicating one load-to-delay mapping is monotonically increasing in a parabolic shape. By way of example, the candidate server experiencing a load of six has a corresponding processing delay of thirteen milliseconds. A load higher than six correspond to a processing delay of greater than thirteen milliseconds; a load of less than six corresponds to a processing delay of less than thirteen milliseconds.

As depicted in the chart 500, an active candidate server may change the load-to-delay response curve used when probed by the requesting (i.e., interrogating) client. For example, the dashed line 520 monotonically increases at a rate faster than the solid line 510. The dashed line 520 corresponds to a "spreading" of candidate servers selected by the process of FIGS. 3 and 4. This spreading occurs because, even though the candidate server has a lesser load than the solid line 510 scenario, the candidate server reports the lesser load as corresponding to a higher delay. The report of a high processing delay likely results in a non-selection of that candidate server.

In contrast to the dashed line 520, the dashed line 530 results in a narrowing effect, where a higher load results in a lesser delay reported. A candidate server responding with information based on the transfer function of the dashed line 530 may be selected, even at higher loads, when measured against the criteria for selecting a good candidate server. Other transfer functions are possible from within an active candidate server. For example, a dashed line 540 is a combination of the spreading function of the dashed line 520 and the narrowing transfer function of the dashed line 530. The dashed line 540, up to approximately a load of four, is a typical monotonically increasing transfer function, similar to solid line 510; but after a load of four, the dashed line 540 increases to a rate similar to the dashed line 520. The transfer function of the dashed line 540 may be used to reserve processing time for a regular set of clients, which may need service in bursts but not on a continual, average basis.

Referring again to FIG. 4B, after selecting a candidate server in step 455, the client 140a issues a substantive service request to the chosen candidate server in step 460. Processing continues at point B in the candidate server 130a, beginning in FIG. 4C.

Figure 4C:
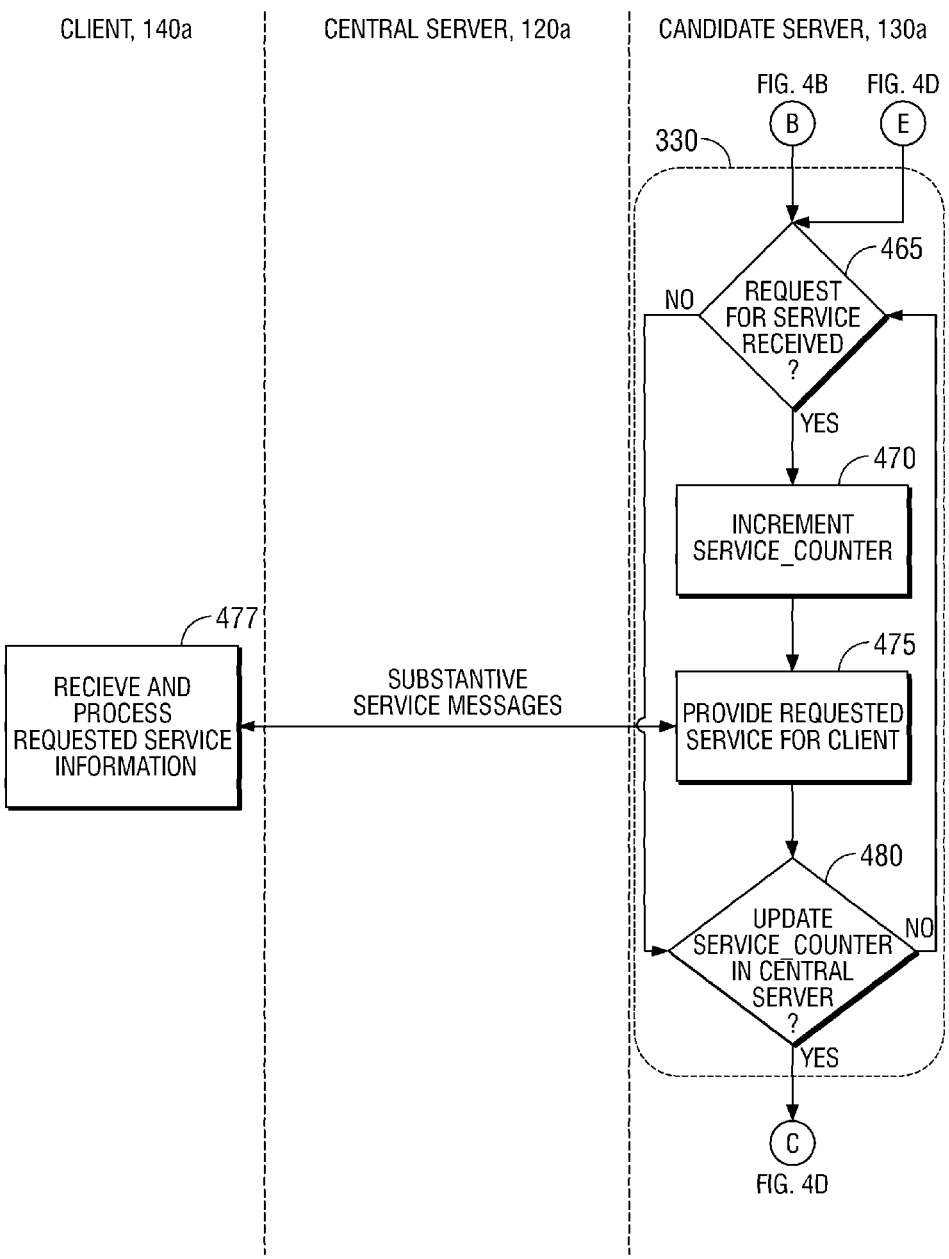
FIG. 4C is a detailed flow diagram of a third portion of the process of FIG. 3.

Referring to FIG. 4C, the detailed flow diagram in the selected candidate server 130a corresponds to the general flow diagram processing step 330 (FIG. 3) of remembering how many times the candidate is selected.

Starting at point B, in step 465, the candidate server determines if a request for service has been received. If a request for service has not been received, then the candidate server 130 continues processing in step 480. If a request for service has been received, meaning that the client has specifically chosen the candidate server 130a over other candidate servers then the candidate server 130a continues processing in step 470.

In step 470, the candidate server 130a service_counter increments its service_count to reflect that it has been selected by the client to provide service. In step 475, the candidate server 130 provides the requested service for the client. The client 140a performs a complementary function in step 477. Substantive messages (e.g., video data) are passed between the client 140a and candidate server 130a until service has been completed.

Alternatively, a probe processing component maintains service_counters. For example, in the DNS-based implementation of FIG. 1, the central server 120a maintains the service_counters rather than the candidate servers 130a. Thus, the central server 120a keeps track of whether the candidate server 130a has been selected to provide the service and then executes processing step 470 to maintain the respective service_counter.

In step 480, the candidate server 130a performs a query to determine if feedback should be provided to update the vector of server selection probabilities 210a with the service_counter. This feedback, as described above, may be caused in many ways, including the number of times the candidate server has been selected, the duration from the last feedback, the time of day, or a requested event. If it is not time to feed back the service_counter, then the central server 120a continues processing in step 465. If the query 480 determines that it is time to feed back the service_counter to the central server 130a, then processing continues in the candidate server at point C, beginning in FIG. 4D.

Figure 4D:
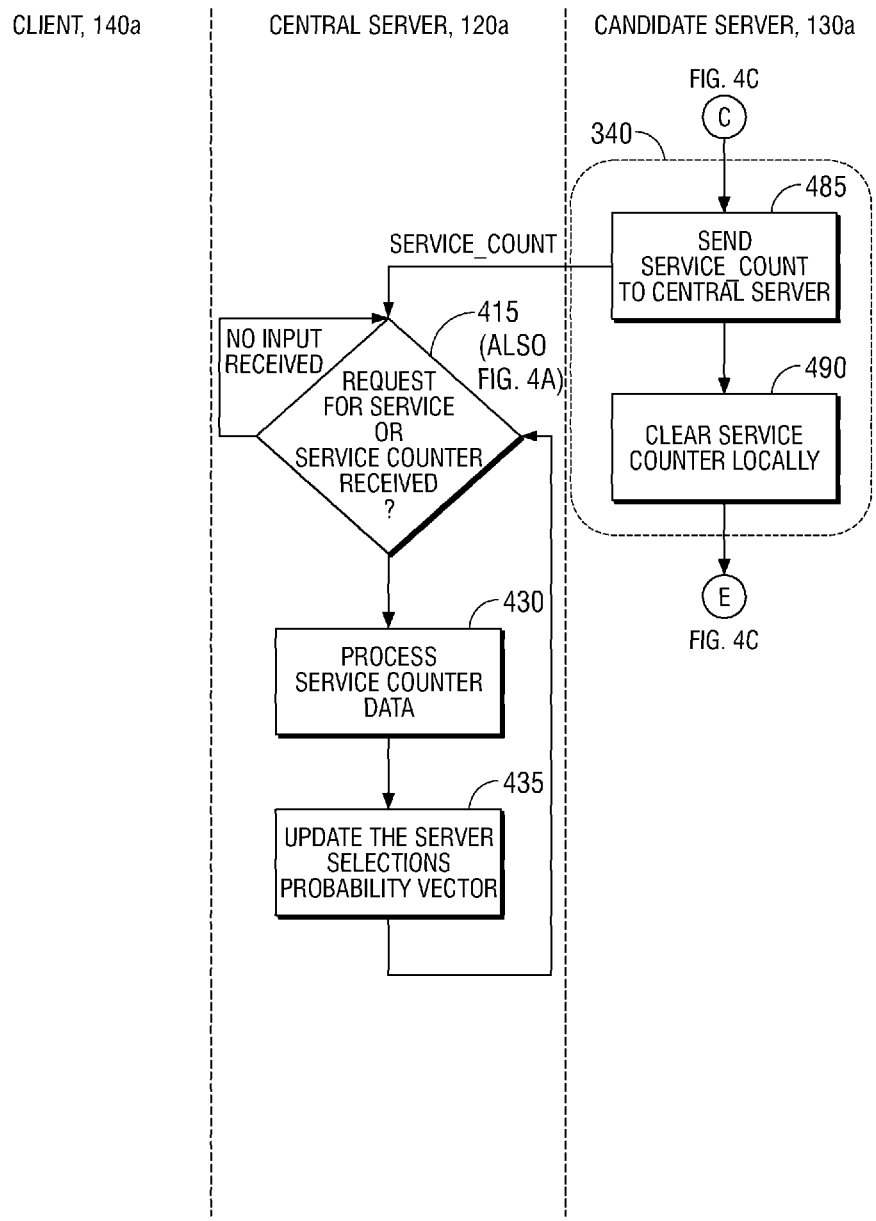
FIG. 4D is a detailed flow diagram of a fourth portion of the process of FIG. 3.

Referring to FIG. 4D, steps 485 and 490 executed by the candidate server 130a correspond to the feedback step of step 340 (FIG. 3). In step 485, the candidate server 130a sends the service_count to the central server. In step 490 in the candidate server 130a, the service_counter is cleared so that an accurate count of the number of times the candidate server 130a has been selected by clients can begin. In step 415 in the central server 120a, the central determines that a service_count has been returned by the candidate server 130a. In step 430, the central server 120a processes the service_count. Then, in step 435, the vector of server selection probabilities 210 is updated with the fed-back service_count from the candidate server 130a. The central server 120a updates the vector of server selection probabilities 210 in a manner described previously. After step 435, the central server process 310 returns to the query 415 to continue servicing the same candidate server, other candidate servers, or clients.

It should be understood that subsets of the clients 140, central servers 120, and candidate servers 130 in the distributed system depicted in FIG. 1 perform respective processes illustrated in FIGS. 3 and 4A-4D. However, modifications in the process from one node to another node may be implemented to improve convergence time and/or robustness of the overall system according to the principles of the present invention.

Figure 6:
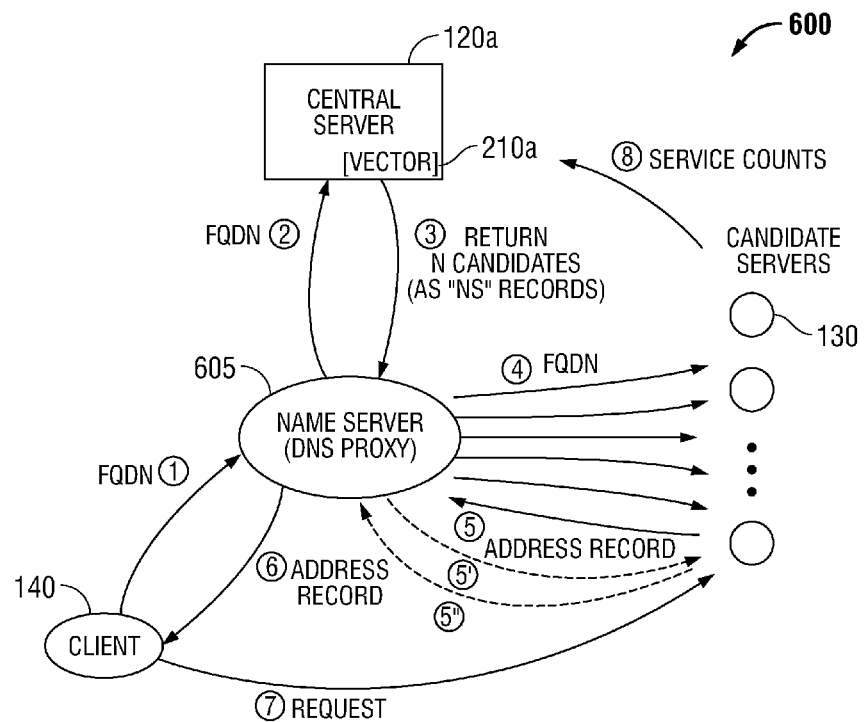
FIG. 6 is a block diagram of a network similar to the network of FIG. 1, but which employs a Domain Name Server (DNS) protocol.

FIG. 6 is a block diagram of a network 600 that employs a DNS (Domain Name System) protocol. In contrast to the network 100 (FIG. 1), the network 600 comprises a name server or DNS proxy 605, which converts a FQDN (Fully Qualified Domain Name) to a corresponding IP address of a server 130. The DNS protocol is utilized by typical Internet web browsers, which allow users to enter addresses as text names (e.g., www.foo.com) rather than numbers (e.g., 255.255.136.18).

The process flow is enumerated along the various links of the network 600. The client first issues an FQDN to the name server 605. The name server 605 forwards the FQDN, in step 2, to the central server 120a because of a relationship previously set up between the name server 605 and the central server 120a. To set up this relationship, the central server 120a tells the name server 605 that, "if you receive an FQDN for a candidate server within a given range, or within a given set of candidate servers, then you, name server 605, will forward the received FQDN to me instead of translating the FQDN to an IP address and/or without determining a candidate server 130 yourself." In other words, the central server 120a is authoritative for FQDNs that invoke the processes described herein.

Upon receiving the FQDN from the pass-through process just described, the central server 120a accesses its vector of server selection probabilities 210a to return, in step 3, server candidates (as "NS" records), in a manner described in reference to FIG. 2. The name server 605 receives the NS records and issues probes in step 4.

In step 4, the FQDNs are issued to the candidate servers returned in the NS records. Typically, the name server 605 will not send probes (requests) to all servers simultaneously, but instead issue only one request at a time, issuing another request (to another server) only if an answer to previous requests was not received in a reasonable time frame (e.g., several seconds). By monitoring the characteristics of the different servers (e.g., response time, when a matching response is not received for a request), the name server 605 is able to bias any requests it sends towards those servers that provide the best service. Therefore, the criterion used to determine "goodness", in the arrangement of the network 600 employing DNS, is a combination of round-trip time for the probe and frequency with which responses to probes are not received (whether because of network congestion, server failure, or otherwise). In the DNS protocol embodiment, the present invention leverages the tendency of name servers 605 to bias their request traffic towards those servers that are providing the best service in mapping a client request to an optimum server.

There are at least two possible methods for instructing the candidate server selected to update its service_count. A first method is depicted in step 5', where the name server 605 issues a packet to the selected candidate server to update its respective service_count. In step 5", the selected candidate server then issues a response to the name server 605 indicating that its respective service_count has been incremented. Thereafter, the name server 605 issues the address record in step 6 to the client so that, in step 7, the client can request its substantive service from the selected candidate server. Using this method, the process is entirely external from the client 140 and requires no action, active or passive, by the client to instruct to the candidate server to increment its service_count. Other active or passive methods for causing the selected candidate server to update its service_count may be employed according to the principles of the present invention.

Step 8 provides the feedback of the service_counts from the candidate servers 130 to the central server 120a. In turn, the central server 120a updates the vector of server selection probabilities 210a.

Figure 7:
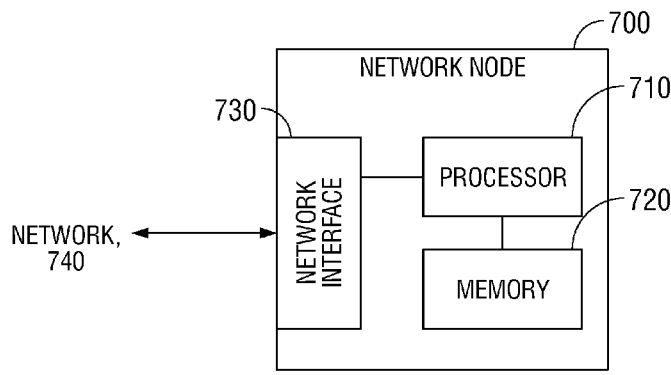
FIG. 7 is a block diagram of a generic network node having an exemplary configuration for executing a process or subprocess of FIG. 3 or FIGS. 4A-4D.
Figure 8:
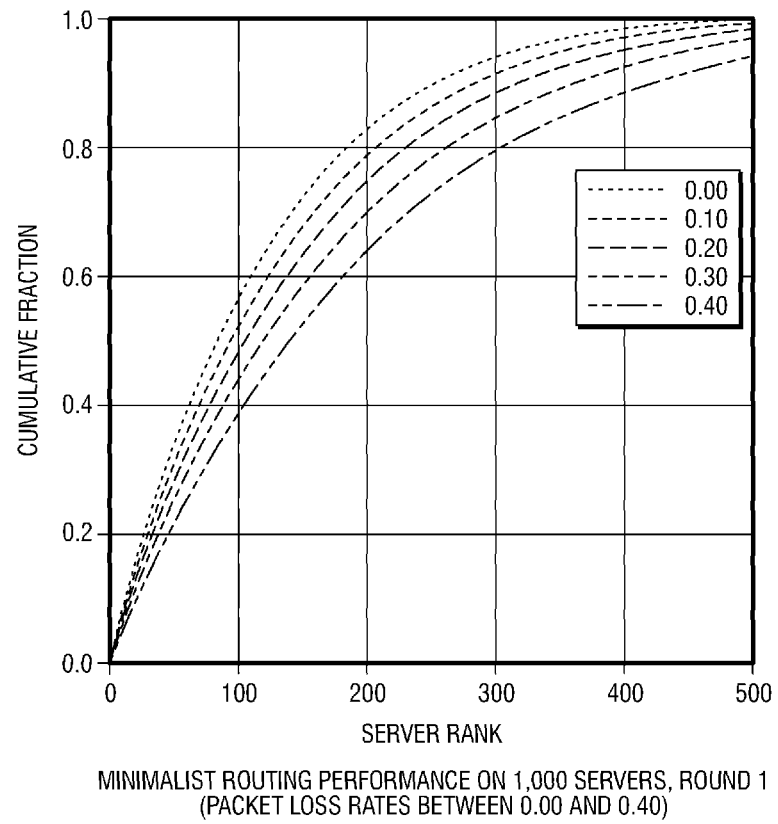
FIGS. 8-11 are plots of simulation results for the embodiment of FIG. 3 that explore the behavior of the minimalist approach to routing in the "Internet case" in the presence of packet loss.
Figure 9:
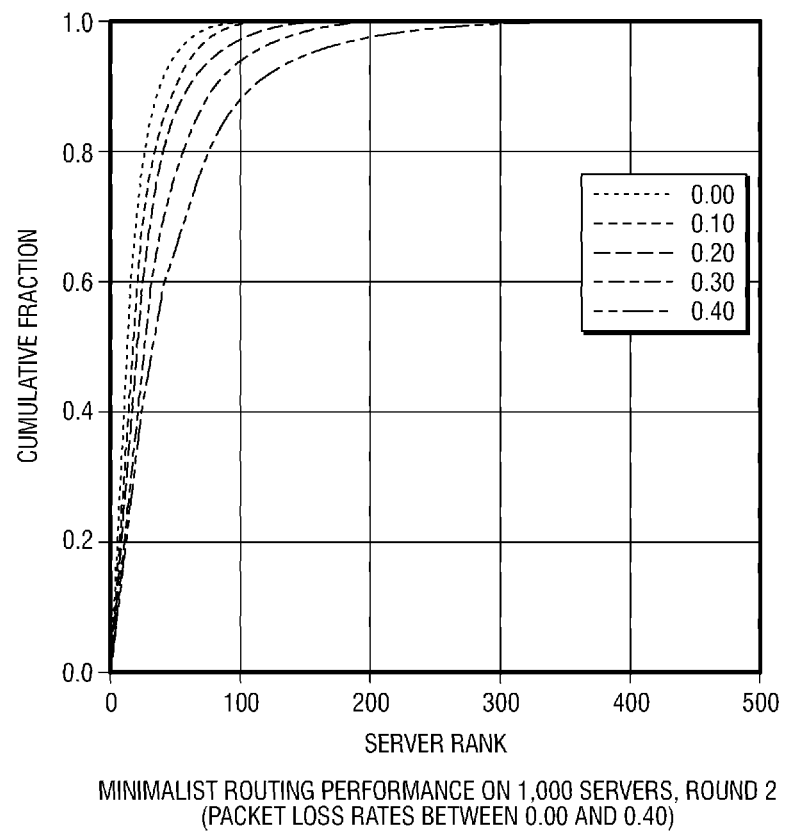
Figure 10:
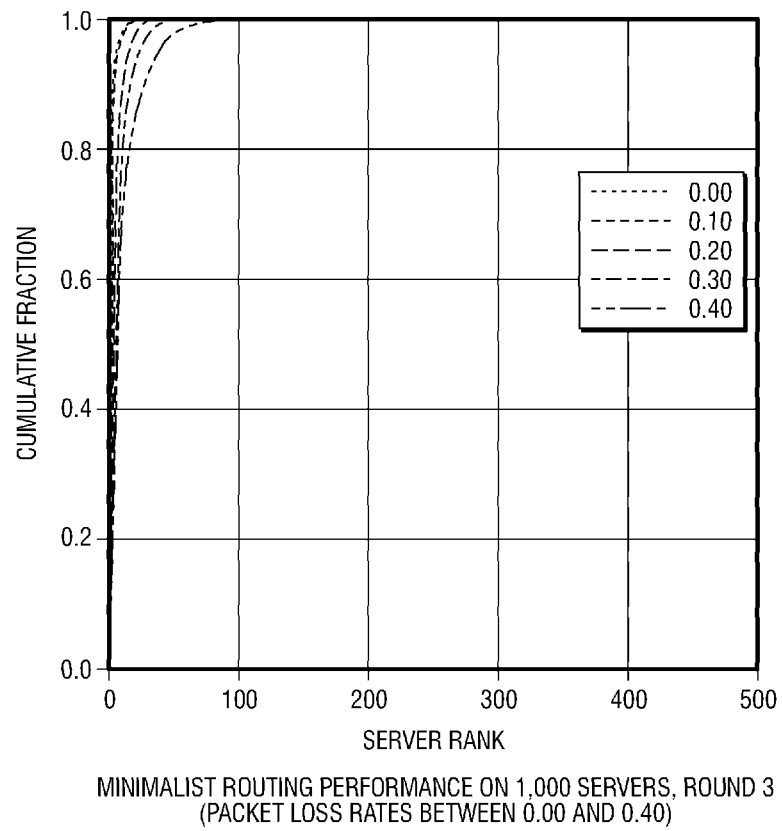
Figure 11:
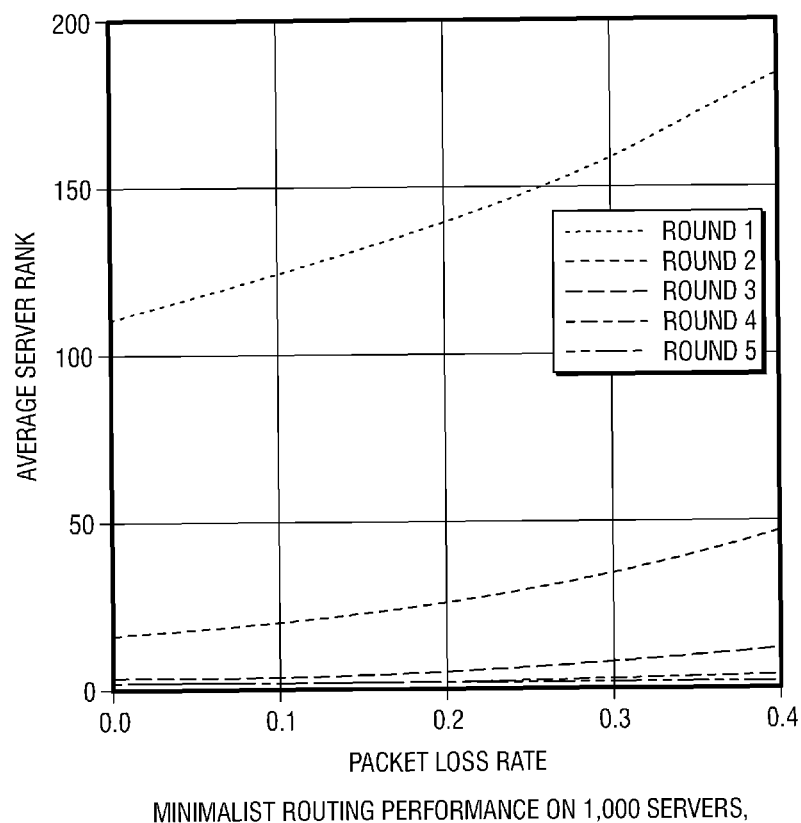

FIG. 7 is a block diagram of a network node 700 coupled to a network 740. The network node 700 includes a processor 710 coupled to memory 720 and a network interface 730. The processor 710 is capable of executing the processes and/or subprocesses described in FIG. 3 and FIGS. 4A-4D, including executing the processes in a distributed or parallel manner. The memory 720 can be RAM, ROM, magnetic disk, optical disk, or other form of computer memory media capable of storing computer program and executable instructions. The memory 720 may also be capable of providing temporary storage for data used in the execution of a process executed by the processor 710. The network interface 730 may include a single interface or plural interface types for transmitting and receiving data across the network 740 to other network nodes. Typically, the data is transmitted and received in network packets.

The network node 700 represents, for example, network nodes of FIG. 1, including client 140a, central server 120a, or server 130. The network node 700, therefore, can support the processes described above, including alternatives thereto, executed by those network nodes.

FIGS. 8-11 are plots of simulation results that explore the behavior of the minimalist approach to routing in the "Internet case" in the presence of packet loss. For the purposes of this discussion, packet loss means any kind of network failure that tends to either (1) prevent successful completion of network probes or (2) delay successful completion of network probes to the point where it is highly probable that any probe that didn't experience packet loss will be completed before one that did.

The simulations used to produce the results of FIGS. 8-11 represent the effects of packet loss by randomly failing simulated network probes at some packet loss rate (constant across all servers in a single experiment and fixed for the duration of each experiment). In the unlikely case that network probes fail for all of the candidate servers returned by a centralized server, a new round of network probes is attempted (for the same set of candidate servers).

The introduction of packet loss disrupts an assumption that the network probe phase always selects a candidate that compares better than all the other candidates (according to whatever total ordering is used for the servers). At a high level, the effect of this disruption is probably similar to that which would be caused by the introduction of measurement noise in the network probes (i.e., if network effects cause the introduction of a "noise" term to the measurement of performance metrics from the client to candidate servers).

The simulations used to produce these results keep the following parameters constant: a candidate server set size of one thousand selection probabilities updated every 100 requests; eight candidate servers (possibly including duplicates) returned in response to each request; six rounds of 100 requests each per simulation experiment; and a total of 100,000 simulation runs. Results are plotted for packet loss rates of 0.00, 0.10, 0.20, 0.30, and 0.40 (where "0.40" corresponds to a 40 percent packet loss rate).

Even in the presence of fairly severe packet loss, server selection still appears to converge fairly rapidly, albeit not quite as rapidly as occurs in the absence of packet loss. For example, at a packet loss rate of 0.40 (40 percent), average server ranks in the first three rounds for the one thousand server case are 185.1, 48.5, and 12.1. Not surprisingly, the data clearly illustrates that the effects of packet loss on convergence rate decrease with packet loss rate. It has been observed (not shown) that the shapes of these curves are essentially invariant for problem sizes one hundred and ten thousand servers (two orders of magnitude), thus bolstering confidence in the likely stability and robustness of this general approach to server selection over a wide range of problem sizes.

This application is related to application Ser. No. 08/779,770 filed Jan. 7, 1997 entitled "Replica Routing"; application Ser. No. 09/294,836 filed Apr. 19, 1999 entitled "Self-Organizing Distributed Appliances"; application Ser. No. 09/294,837 filed Apr. 19, 1999 entitled "Replica Routing"; and Provisional Application No. 60/160,535 filed Oct. 20, 1999 entitled "Automatic Network Address Assignment and Translation Inference".

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for optimizing server selection for clients from among a plurality of servers in a packet communication network, the system comprising:
a plurality of servers for alternatively responding to client requests;
a central server that maintains server selection weights, and, based on the weights, provides in response to a client request a candidate server list of at least two candidate servers to a network node, other than the central server, adapted to interrogate individual servers represented in the candidate server list, the central server receiving feedback from the interrogated individual servers indicating service by the individual servers in response to client requests and modifying the server selection weights based on the feedback, the central server adds to the candidate server list an extra candidate server;
wherein the extra candidate server is randomly selected; and
wherein a number of servers in the candidate server list, including the candidate servers and the extra, randomly selected, candidate server, is a fixed percentage or a fixed number beyond the number of servers selected based on the weights.

2. The system according to claim 1 further comprising a DNS server, the DNS server:
receives the client request from the client; and
based on the client requests, forwards the client requests to the central server.

3. The system according to claim 2, wherein the DNS server interrogates candidate servers in the candidate server list.

4. The system according to claim 3, wherein the DNS server selects a candidate server based on the interrogation.

5. The method according to claim 4, wherein the DNS server:
indicates to the selected candidate server that it has been selected to provide service to the requesting client; and
returns the address of the selected candidate server to the client.

6. The system according to claim 3, wherein the DNS server returns to the requesting client the address of the first server to respond to the interrogation.

7. The system according to claim 6, wherein the DNS server transmits to the client a redirection packet to inform the selected server of being selected.

8. The system according to claim 1, wherein each candidate server in the candidate server list is unique from each other candidate server in the list.

9. The system according to claim 1, wherein the feedback occurs according to at least one of the following: number of times the respective server is selected, duration from last feedback, time of day, or requested event.

10. The system according to claim 1, wherein the weights are based on bias factors to reduce convergence time, the bias factors including at least one of: a number of times selected, moving average based on a specified amount of time, historical count information, time of day, time of year, calendar event, or geographical location.

11. The system according to claim 1, wherein the weights sum to one.

12. The system according to claim 1, wherein the central server includes vectors of server selection weights for subsets of clients.

13. The system according to claim 1, wherein the central server includes multiple central servers organized as a distributed system.

14. The system according to claim 1, wherein the client interrogates the candidate servers in the candidate server list to measure at least one of the following: network performance between the client and candidate server, server congestion, or server load.

15. The system according to claim 1, wherein the candidates represented in the candidate server list are pseudo-randomly selected based on the weights.

16. The system according to claim 1 wherein the network node adapted to interrogate individual servers is a client.

17. The system according to claim 1 wherein the network node adapted to interrogate individual servers is a DNS server.

18. The system according to claim 1 wherein the network node determines from an interrogation of the individual servers, represented in the candidate server list, by the issued probes and the received responses, which of the individual servers is to service the client request.

19. A method for optimizing server selection for clients from among a plurality of servers in a packet communication network, the method comprising:
providing in response to a client request for a server address a candidate server list by a central server to a network node, other than the central server, adapted to interrogate individual servers represented in the candidate server list, the candidate server list including at least two server addresses selected based on weights corresponding to the candidate servers;

selecting a preferred server from candidate server list;

feeding back service metrics to the central server from the interrogated individual servers corresponding to service provided by the respective servers;

updating the weights based on the service metric;

adding to the candidate server list an extra candidate server;

wherein the extra candidate server is randomly selected; and wherein a number of servers in the candidate server list, including the candidate servers and the extra, randomly selected, candidate server, is a fixed percentage or a fixed number beyond the number of servers selected based on the weights.

20. The method according to claim 19 further including the step of forwarding the client request to the central server by a DNS server.

21. The method according to claim 20, wherein the step of selecting a preferred server is executed by the DNS server.

22. The method according to claim 21, further including, by the DNS server, the steps of:

informing the selected server that it has been selected to provide service to the requesting client; and returning the address of the selected server to the client.

23. The method according to claim 21, further including, by the DNS server, the step of returning to the requesting client the address of the first server from which the probe is returned.

24. The method according to claim 23, wherein the DNS server transmits to the requesting client a redirection packet to cause the selected server to modify its respective service metric.

25. The method according to claim 19, wherein each server represented in the candidate server selection list is unique from each other server represented in the list.

26. The method according to claim 19 wherein the feedback occurs according to at least one of the following: number of times selected, duration from last feedback, time of day, or requested event.

27. The method according to claim 19 wherein the weights are based on bias factors to reduce convergence time, the bias factors including at least one of: number of times selected, moving average based on length of recording time, historical count information, time of day, time of year, calendar event, or geographical location.

28. The method according to claim 19 wherein the weights sum to one.

29. The method according to claim 19 wherein the central server includes unique vectors of server selection weights for subsets of clients.

30. The method according to claim 19 wherein the central server includes multiple central servers organized as a distributed system.

31. The method according to claim 19 wherein selecting the preferred server comprises interrogating the servers to measure at least one of the following: network performance between client and server, server congestion, or server load.

32. The method according to claim 19 wherein the network node adapted to interrogate individual servers is a client.

33. The system according to claim 19 wherein the network node adapted to interrogate individual servers is a DNS server.

34. The method according to claim 19 wherein selecting the preferred server from the candidate server list includes determining from an interrogation of the individual servers, represented in the candidate server list, by the issued probes and the received responses, which of the individual servers is to service the client request.

35. The method according to claim 19, wherein the adding includes adding the extra candidate server without altering the weights of the candidate servers.

36. By a central server in a packet communication network, a method for providing a client with a list of possible optimal servers from among a plurality of servers also on the network, comprising:

maintaining weights corresponding to a plurality of servers;

in response to receiving a client request from a client, selecting a candidate server list of at least two candidate servers from among the servers represented by the weights;

providing the candidate server list to a network node, other than a network node selecting the candidate server list, adapted to interrogate individual servers represented in the candidate server list;

receiving feedback from the interrogated individual servers related to service by the servers for maintaining the weights; and adding to the candidate server list an extra candidate server;

wherein the extra candidate server is randomly selected; and wherein a number of servers in the candidate server list, including the candidate servers and the extra, randomly selected, candidate server, is a fixed percentage or a fixed number beyond the number of servers selected based on the weights.

37. The method according to claim 36 further including:

establishing a relationship with a DNS server to have the DNS server pass to the central server requests from clients for a server known by the central server.

38. The method according to claim 36 wherein the extra candidate server is randomly selected.

39. The method according to claim 36 wherein the weights are based on bias factors to reduce convergence time, the bias factors including at least one of:

number of times selected, moving average based on length of recording time, historical count information, time of day, time of year, calendar event, or geographical location.

40. The method according to claim 36 wherein the central server includes unique vectors of weights for subsets of clients.

41. The method according to claim 36 wherein the network node adapted to interrogate individual servers is a client.

42. The system according to claim 36 wherein the network node adapted to interrogate individual servers is a DNS server.

43. The method according to claim 36 further comprising determining from an interrogation of the individual servers, represented in the candidate server list, by the issued probes and the received responses, which of the individual servers is to service the client request.

44. A computer program product comprising:

a non-transitory computer readable medium for storing data; and a set of computer program instructions embodied on the computer readable medium, including instructions to:

maintain weights related to service provided by servers;

in response to receiving a request from a client, select a candidate server list of at least two candidate servers from among the servers represented by the weights based on the weights;

provide the candidate server selection list to a network node, other than a network node executing the instructions to select the candidate server list, adapted to interrogate individual servers represented in the candidate server list;

receive feedback from the interrogated individual servers to maintain the weights; and add to the candidate server list an extra candidate server;

wherein the extra candidate server is randomly selected; and wherein a number of servers in the candidate server list, including the candidate servers and the extra, randomly selected, candidate server, is a fixed percentage or a fixed number beyond the number of servers selected based on the weights.

45. The computer program product according to claim 44 further including instructions to:

establish a relationship with a DNS server to have the DNS server pass to the central server client requests for a server known by the central server.

46. The computer program product according to claim 44 wherein the probabilities are based on bias factors to reduce conversion time, including at least one of:

number of times selected, moving average based on length of recording time, historical count information, time of day, time of year, calendar event, or geographical location.

47. The computer program product according to claim 44 wherein the central server includes unique vectors of weights for subsets of clients.

48. The computer program product according to claim 44 wherein the network node adapted to interrogate individual servers is a client.

49. The computer program product according to claim 44 wherein the network node adapted to interrogate individual servers is a DNS server.

50. The computer program product according to claim 44 further including instructions to determine from an interrogation of the individual servers represented in the candidate server list by the issued probes and the received responses, which of the individual servers is to service the client request.

51. An apparatus for providing a client with a list of possible optimal servers from among a plurality of servers also on the network, the apparatus comprising:

means for maintaining weights based on service by servers;

means for receiving a request from a client;

means for selecting a candidate server selection list of at least two candidate servers based on the weights from among the servers represented by the weights; and means for providing the candidate server selection list to a network node other than a network node including the means for selecting the candidate server selection list, adapted to interrogate individual servers represented in the candidate server list;

means for receiving feedback from the interrogated individual servers; and means for adding to the candidate server list an extra candidate server;

wherein the extra candidate server is randomly selected; and wherein a number of servers in the candidate server list, including the candidate servers and the extra, randomly selected, candidate server, is a fixed percentage or a fixed number beyond the number of servers selected based on the weights.

52. The apparatus according to claim 51 further comprising means for establishing a relationship with a DNS server to have the DNS server pass requests from clients for a server to the means for receiving a request from a client.

53. The apparatus according to claim 51 wherein the network node adapted to interrogate individual servers is a client.

54. The apparatus according to claim 51 wherein the network node adapted to interrogate individual servers is a DNS server.

55. The apparatus according to claim 51 further comprising means for determining from an interrogation of the individual servers represented in the candidate server list by the issued probes and the received responses, which of the individual servers is to service the client request.

56. An apparatus for providing a client with a list of possible optimal servers from among a plurality of servers also on the network, the apparatus comprising:

one or more processors coupled to memory storing weights related to service provided by a plurality of servers, said one or more processors executing a computer program to:

maintain the weights;

receive a request from a client;

in response to the request, select a candidate server list of at least two candidate servers from among the servers represented by the weights;

add to the candidate server list an extra candidate server;

an interface coupled to the one or more processors and the network (i) to provide the candidate server list to a network node, other than a network node with the computer program to select a candidate server list, adapted to interrogate individual servers represented in the candidate server list and (ii) to receive feedback from the interrogated individual servers;

wherein the extra candidate server is randomly selected; and wherein a number of servers in the candidate server list, including the candidate servers and the extra, randomly selected, candidate server, is a fixed percentage or a fixed number beyond the number of servers selected based on the weights.

57. The apparatus according to claim 56 wherein the one or more processors establishes a relationship with a DNS server to have the DNS server pass to the one or more processors requests from clients for a server known by the one or more processors.

58. The apparatus according to claim 56 wherein the probabilities are based on bias factors to reduce convergence time, including at least one of:

number of times selected, moving average based on length of recording time, historical count information, time of day, time of year, calendar event, or geographical location.

59. The apparatus according to claim 56 wherein the memory includes unique vectors of weights for subsets of clients.

60. The apparatus according to claim 56 wherein the network node adapted to interrogate individual servers is a client.

61. The apparatus according to claim 56 wherein the network node adapted to interrogate individual servers is a DNS server.

62. The apparatus according to claim 56 wherein the extra candidate server is randomly selected.

63. The apparatus according to claim 56 wherein each candidate server in the candidate server list is unique from each other candidate server in the list.

64. The apparatus according to claim 56 wherein a feedback occurs according to at least one of the following: number of times the respective server is selected, duration from last feedback, time of day, or requested event.

65. The apparatus according to claim 56 wherein the weights are based on bias factors to reduce convergence time, the bias factors including at least one of: a number of times selected, moving average based on a specified amount of time, historical count information, time of day, time of year, calendar event, or geographical location.

66. The apparatus according to claim 56 wherein the weights sum to one.

67. The apparatus according to claim 56 wherein the servers includes vectors of server selection weights for subsets of clients.

68. The apparatus according to claim 56 wherein the servers includes multiple servers organized as a distributed system.

69. The apparatus according to claim 56 wherein the client interrogates the candidate servers in the candidate server list to measure at least one of the following: network performance between the client and candidate server, server congestion, or server load.

70. The apparatus according to claim 56 wherein the candidates represented in the candidate server list are pseudo-randomly selected based on the weights.

71. The apparatus according to claim 56 wherein the one or more processors determines from an interrogation of the individual servers represented in the candidate server list by the issued probes and the received responses, which of the individual servers is to service the client request.

* * * * *